Dec. 30, 1924.                                                              1,521,249
T. OLINGER
SHEET METAL DAMPER CLIP
Filed May 6, 1922

Inventor
Thomas Olinger
By Frank E. Liverance, Jr.
Attorney.

Patented Dec. 30, 1924.

UNITED STATES PATENT OFFICE.

THOMAS OLINGER, OF HOLLAND, MICHIGAN, ASSIGNOR, BY MESNE ASSIGNMENTS, TO FEDERAL MANUFACTURING COMPANY, OF HOLLAND, MICHIGAN, A CORPORATION OF MICHIGAN.

SHEET-METAL DAMPER CLIP.

Application filed May 6, 1922. Serial No. 558,869.

*To all whom it may concern:*

Be it known that I, THOMAS OLINGER, a citizen of the United States of America, residing at Holland, in the county of Ottawa and State of Michigan, have invented certain new and useful Improvements in Sheet-Metal Damper Clips; and I do hereby declare the following to be a full, clear, and exact description of the invention, such as will enable others skilled in the art to which it appertains to make and use the same.

This invention relates to a sheet metal damper clip which is particularly adapted for use with dampers in warm air pipes of furnaces. It is a primary object and purpose of the present invention to make a damper entirely of sheet metal, of parts which are easily stamped and formed from sheet metal, one of said parts being the clip of my invention which is readily attached to the damper body or disk and with which an operating member may be associated to operate the damper. In the present invention the clip is easily attachable to the damper disk and the operating member is quickly connected with the clip when the damper is installed in the furnace pipe. Economy of manufacture and ease and facility in installation are combined in the structure. Various other objects and purposes will be outlined as the description progresses of the preferred embodiment of the invention illustrated in the accompanying drawing, in which, Fig. 1 is a transverse section through a furnace pipe with the damper therein, the damper being shown in elevation.

Like reference characters refer to like parts in the different figures of the drawing.

Figure 1:
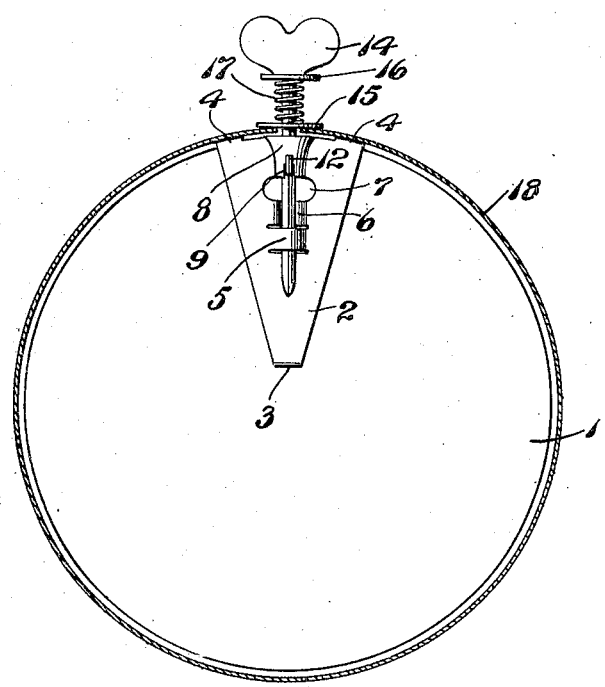
Figure 2:
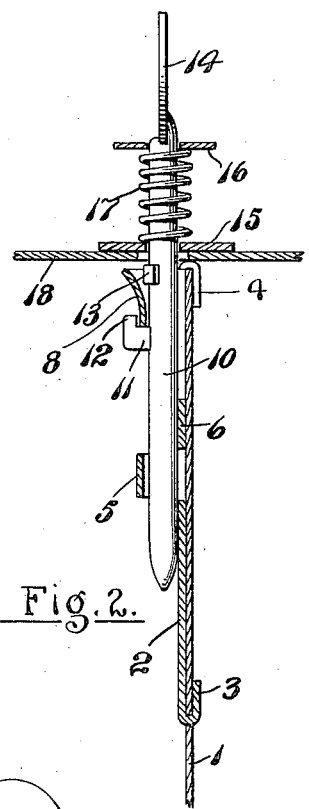
Fig. 2 is a fragmentary enlarged section through the pipe and damper showing the connection of the operating member and damper.
Figure 3:
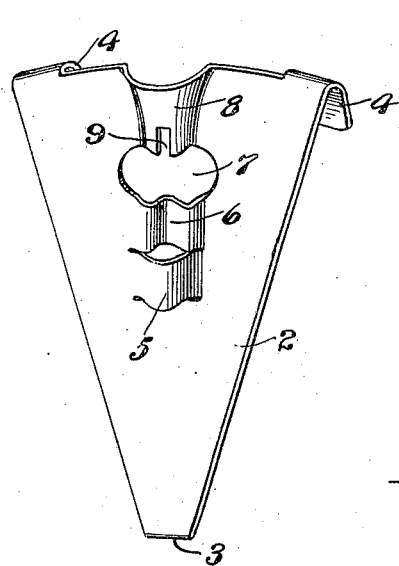
Fig. 3 is a perspective view of the clip used with the damper disk for ready attachment of the operating member.
Figure 4:
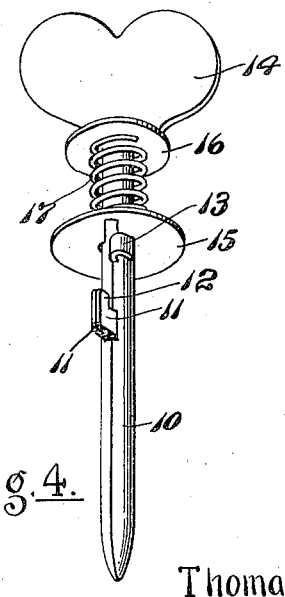
Fig. 4 is a perspective view of the operating member.

The damper includes a plain circular disk 1 of sheet metal, with which a clip 2, also of sheet metal, is associated, being permanently attached thereto. The disk with the clip form one main member of the damper. The clip is substantially triangular in shape and at one corner thereof has a pointed lip 3 bent to pass through the disk 1, after which it is clinched against the disk, as shown in Fig. 2. At the other corners, ears 4 are extended and turned back to pass on the opposite side of the disk 1 and clinched thereagainst. A secure and permanent connection of the disk and clip is thus made.

Centrally of the clip 2 and paralleling the longest dimension thereof, the clip is provided with a series of pressed forms and openings. Two sections of relatively narrow width are cut and pressed in opposite directions to make two concaved guides 5 and 6, the former being farthest in from the side of the clip. An opening 7 is cut through the clip next to the guide 6. A curved guide 8 is pressed from the clip at the edge of the same and in the same direction that guide 5 is pressed, being flared outwardly at its outer portion and having a slot 9 cut in its inner edge, practically in communication with the opening at 7.

The other main member of the damper is the operating member formed from sheet metal which is rolled into the shape of a rod 10. Between its ends, and at the meeting edges of the metal in the rod, integral lips 11 are left which are positioned side by side, each having an overhanging portion or extension 12 which parallels the length of the rod, as shown. A third lip 13 is cut integral with the metal at one edge thereof and is extended outwardly and curved back toward the rod a short distance from the lips 11. At the outer end of the rod, an operating handle 14, flat in shape, is formed, adapted to be engaged by the hand for turning the damper when the operating member is connected therewith.

Two washers 15 and 16 are located on the rod 10 between the lip 13 and the handle 14, one against the lip and the other against the inner edge of the handle, a coiled spring 17 around the rod serving to force said washers or disks away from each other. In practice, the disks 15 and 16 may be placed over the rod, slots being made in the disks for the passage over the lip 13 which is bent backward after the washers are in place, thus preventing the same from coming off.

In the assembly, the disk with attached clip is placed within the furnace pipe 18 at the proper position, and the operating member connected therewith by insertion of the rod 10 through an opening in the pipe, the rod passing through guides 8, 6 and 5; the lips 11 being forced through under the guide 8 to the opening at 7. In such position, the first washer 15 comes against the pipe 18 and the spring 17 is compressed somewhat. Turning the operating member by manipulating the handle 14, moves the lips 11 with overhanging extensions 12 so that the lips come in conjunction with the slot 9 in guide 8, whereupon the spring 17 moves the operating member as a whole so that the lips 11 enter the slot 9 and the overhanging portions pass over the adjacent portion of the guide 8, as fully shown in Fig. 2. This makes a secure connection of the disk and operating member therefor and one which permits a ready turning of the disk in the pipe to any desired position. The spring 17 serves to bring ears 4 against the inner side of the pipe 18, making a frictional engagement which holds the damper in any position to which turned.

The construction is simple, economically made from sheet metal parts in its entirety, quickly and easily assembled when it is to be used, both parts of the construction consisting of parts inseparably connected so that no danger of loss of any part is present. The device is practical and serviceable in every respect. The invention is defined in the claim appended hereto and it is to be considered that the invention comprehends all forms of structure coming within their scope.

I claim:

A damper operating member comprising a rod rolled from a single piece of sheet metal and formed at one end with a flat operating handle, two lips extending from the rod integral therewith at the meeting edges of the metal forming the rod, said lips lying side by side, two spaced apart washers located over the rod, one bearing against the operating handle, a coiled spring between the washers, and a third lip projecting from the rod against which the other washer is pressed by the spring.

In testimony whereof I affix my signature.

THOMAS OLINGER.